Jan. 2, 1968     L. BUSCHMANN     3,360,845

METHOD OF REPAIRING AND/OR REINFORCING CASTINGS

Filed Dec. 11, 1964     2 Sheets-Sheet 1

INVENTOR
*LOUIS BUSCHMANN*

BY

*Woodhams, Blanchard & Flynn*

ATTORNEYS

Jan. 2, 1968 L. BUSCHMANN 3,360,845
METHOD OF REPAIRING AND/OR REINFORCING CASTINGS
Filed Dec. 11, 1964 2 Sheets-Sheet 2

INVENTOR
LOUIS BUSCHMANN
BY
Woodhams, Blanchard and Flynn
ATTORNEYS

United States Patent Office 3,360,845
Patented Jan. 2, 1968

3,360,845
METHOD OF REPAIRING AND/OR REINFORCING CASTINGS
Louis Buschmann, Thionville, Moselle, France, assignor to Clugston Holdings Limited
Filed Dec. 11, 1964, Ser. No. 417,606
5 Claims. (Cl. 29—401)

ABSTRACT OF THE DISCLOSURE

A method of reinforcing castings wherein the castings have laterally extending projections on the surface thereof and a reinforcing plate or band which has openings at locations corresponding to the projections. The plate is positioned adjacent the casting with the projections extending through the openings and the projections are welded to the adjacent portions of the reinforcing plate.

---

The invention relates to a method and the product of the method for repairing and/or reinforcing castings by means of plates, bands, corsets or the like by plug or slot welding, and a method of producing new castings which are reinforced as a preventive measure.

Castings often have undesirable cracks which develop during their production or during use owing to internal, liberated stresses. These faults occur most frequently in parts subject to thermal shocks, such as ingot molds used in steelworks and slag ladles.

In the case of thick walls, the repair of such cracks by welding alone is very costly, since a considerable amount of trimming has to be carried out prior to the welding operation.

Where repair by welding alone is found to be too costly, the contour of the crack is generally simply sealed off on the inside to a small extent. In order to prevent an increase in size or an expansion of the crack, a mechanical repair is carried out in which one or more steel plates are placed on the outer surface of the piece to straddle the crack. The steel plates are secured in position by means of steel pins, which are pressed or screwed into blind holes previously drilled into the casting. The plate is drilled with holes for the steel pins beforehand, and when the plate is fitted, the pin heads are caulked or are then welded to the plate.

Other highly laborious methods of mechanical repair consist in using one or more plugs or keys having bulging ends of dove-tail section, for example. The pins or keys are secured in position either by means of weld beads in cells provided on both sides of the crack and hollowed out along the whole length thereof, or by being forced into symmetrical formations of a suitable shape, which are provided on both sides of the crack in substantially rectangular relation thereto.

Experience has shown that such mechanical repairs involve considerable disadvantages resulting from the high costs due to the numerous complications, and due to the insufficient strength of the repaired part resulting from the holes provided to enable the steel pins, keys or plugs to be fitted, more particularly since the pins cause splintering. Under any strain, the pins bear on half of the circle formed by the first few turns of the thread, or on the internal smooth edges of their bearings, and act as levers on the outer turns or on the smooth part at the base of the other half of the periphery. The pins thus work loose, so that a high tension in the direction of the outer surface develops in a limited zone of the piece. This tension, which is evident from tiny cracks in the casting, will expand rapidly whenever the bonding power of the metal is reduced by heating to a value below that of the local stresses applied by the end of the pin. After the casting has been used for a determined number of periods, this phenomenon eventually finishes with splintering of the metal and disappearance of part of the pin bearing, so that the pin and the mechanical repair in general becomes worthless.

None of the repairing methods known at the present time has been able to avoid these disadvantages.

The method of the invention permits, for example, the performance of repairs virtually without interrupting the frequency of the cycle of successive casts with the same ingot mould, since the residual temperature during the waiting time between the two ingot pourings into the same mold just corresponds to the period during which a repair can be carried out under the optimum physical conditions. Thus the invention affords substantial advantages for the iron and steel industry and other industries in which casting equipment is used.

According to the invention there is provided a method of repairing cracked castings and/or for the reinforcement of, or prevention of the formation of cracks in, castings. For example, in ingot molds for steelworks, slag ladles, or the like at least one plate which is pre-heated or cold and provided beforehand with drilled holes preferably circular, oval or elongated and of determined dimensions covering the crack, is secured to the casting by plug welding through the holes.

Thus the resistance offered by the plate placed on the casting for reinforcement is sufficient to prevent the crack from increasing in size.

In an ingot mold, for example, the plate has to be capable of resisting the expansions undergone by the walls of the mold during the casting of the steel ingot. For this reason, the plate is secured in position on the casting by one or more plug welds on both sides of the crack at a sufficient distance from the crack to allow for the brittleness of the metal. By virtue of the holes provided for this purpose, the plug welds by their own resistance are effective to combine the metal of the plate intimately with that of the casting.

The holes provided are of sufficient size and/or number to afford an ample safety margin to take care of local casting or welding faults.

In tests carried out with flat 12-ton ingot molds, very good results have been achieved by using plates having a thickness of 20 mm. into which holes having a diameter of about 6 to 8 cm. were drilled one on each side of the crack at a clear distance of 10 cm. between circumferences for a length of crack of 10 cm.

In accordance with the invention, moreover, the plate is preferably secured in position by hot welding, since cold welding is more costly and less durable in use. Hot welding of the casting also permits of an excellent bond between the base and the deposited metals. During the hot welding operation, the base metal is heated to a temperature above its melting point, and the bond is obtained to a considerable depth. This results in a remarkable cohesion in the welding zone so that excellent durability of the repair is ensured.

In one modification according to the invention, the bond between the plate and the casting to be repaired or reinforced is obtained by means of plug welds which fill the holes of circular (preferable), oval or elongated section, thus ensuring the optimum conditions with respect to durability of the repair or reinforcement with a weld of the smallest possible volume. The amount of weld metal required for securing the plate or plates in position on the casting to be repaired or reinforced is calculated with reference to the mechanical stresses to be sustained allowing for an adequate safety margin. Depending upon the shape and dimensions of the cracks, the volume of weld metal is distributed at one or more positions on both sides of the crack or cracks to be repaired. The holes drilled into the plate or plates used are determined by the disposition selected for distribution of the total mass of the weld metal required. An additional plug weld may be provided at the closed end of the crack. If necessary, the plates may be bent in order to adjust them to the shape of the casting to be repaired, for example, when the crack is in or adjacent a corner.

The repairing and reinforcing method according to the invention may require a preliminary partial welding up of the crack whenever this appears to be necessary. Any welding up operation required is carried out, not so much for the purpose of preventing a crack from increasing in size, as for the purpose of preventing the molten steel from flowing into the crack during the casting of the ingot, particularly where it is a question of repairing ingot molds. An inflow of steel into the crack would cause difficulties in the stripping operation, and an undesirable rib would form on the corresponding surface of the ingot.

One modification according to the invention consists of a method of preventive reinforcement of casting means, such as ingot molds for steelworks, in which the holes in the perforated plates are filled during the manufacture of the molds. For this purpose, the reinforcing plates are placed into the casting mold box for the ingot molds beforehand. The plug joints are thus obtained at little cost, and the application of weld metal in hole filling operations, carried out for the purpose of forming plug welding nipples and rivetings, is avoided. In this manner it is possible for a portion of the periphery of the ingot mold to be reinforced. If desired, the whole periphery over part of its height, or over its entire height, may be enclosed by a band corset or the like, made of steel or other metal, it being, in accordance with the invention, possible for the wall thickness of the ingot mold to be reduced to the minimum.

These advantages and additional advantages afforded by the invention are illustrated in the accompanying drawings, in which the invention is diagrammatically illustrated by way of example, and in which.

Figure 1:
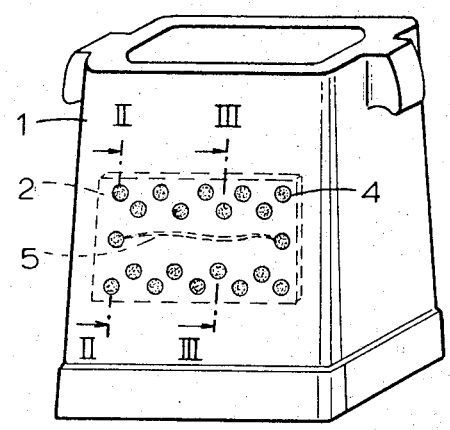
FIGURE 1 is a perspective view of an ingot mold having a transverse crack.
Figure 4:
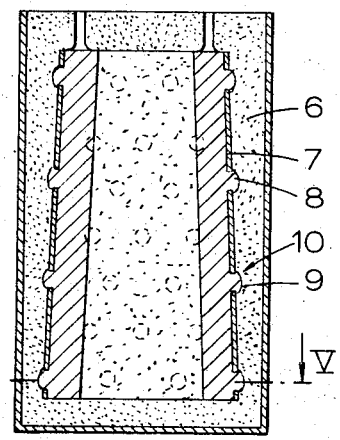
FIGURE 4 is a vertical section through the molding box shown in FIGURE 1.

In the construction illustrated by way of example in FIGURE 1, the wall of a cast ingot mold 1 contains a substantially horizontal crack 5. In accordance with the invention, a perforated plate 2 is placed on the surface of the ingot mold wall over the crack 5 and secured to the wall of the ingot mold 1 by a plug weld 4.

Figures 2, 3:
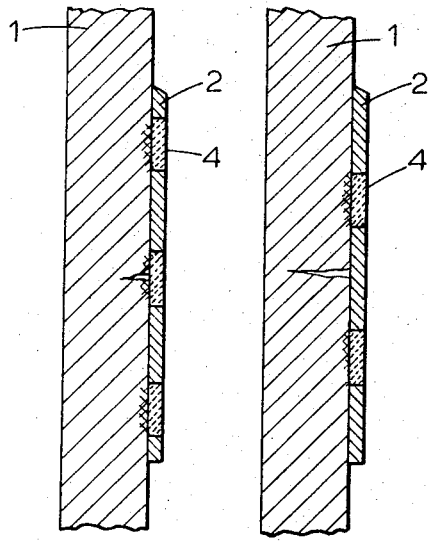
FIGURE 2 is an enlarged vertical section through the wall of the ingot mold of FIGURE 1 on which a plate is secured in position by plug welding.
FIGURE 3 is an enlarged vertical section through a joint with two plug welds in FIGURE 1.
Figure 5:
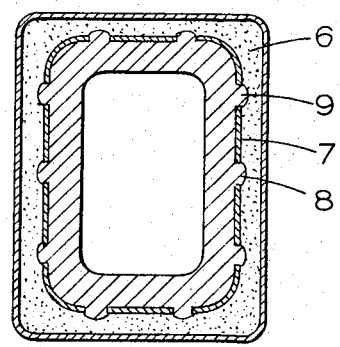
FIGURE 5 is a horizontal section through the molding box illustrated in FIGURE 4.
Figure 6:
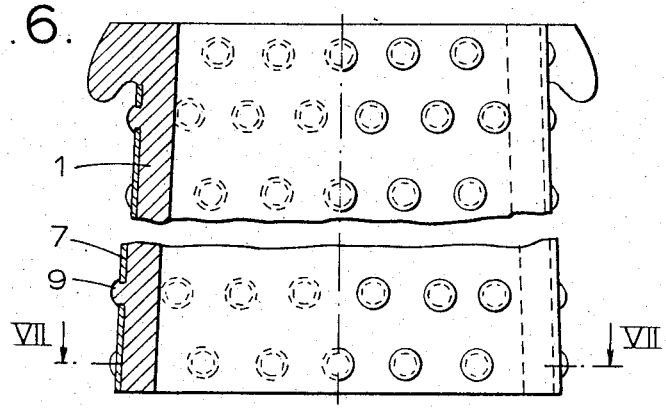
FIGURE 6 is a front elevation and partially vertical section of an ingot mold for steelworks.
Figure 7:
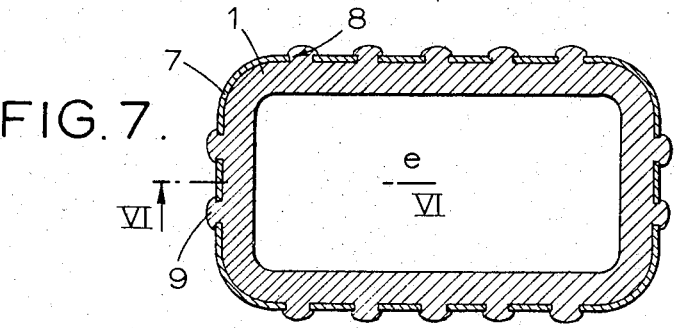
FIGURE 7 is a horizontal section of the ingot mold illustrated in FIGURE 6.

In the representation shown on an enlarged scale in FIGURE 2 three plug welds 4 are shown, one of which limits the beginning or end of the crack 5 (FIGURE 1).

The remaining plug welds are disposed at a greater distance laterally of the crack 5.

In the construction illustrated in FIGURE 3, the two plug welds 4 closest to the crack 5 are provided along the section III—III passing through the ingot mold shown in FIGURE 1. FIGURES 2 and 3 both show the approximate relation between the wall of the ingot mold and the plate 2 welded thereto, and the penetration of the plug welds in the metal of the ingot mold 1.

The plates 2 may preferably be heated to a high temperature. They contain holes made beforehand which may be of circular, oval or any other section. The holes are welded up, so that the plate 2 is applied securely to the wall of the ingot mold on both sides of the crack 5.

Where it appears to be expedient and practicable, the piece to be repaired or to be reinforced may be provided on two sides instead of on one side only with reinforcing plates 2 according to the invention.

In specific cases, for example, where it is impossible for the reinforcing plate 2 to be secured to the surface of the ingot mold 1, or to that of the casting, the reinforcement plate 2 may be embedded in a cavity hollowed out particularly for this purpose. In such a case, all of the cavities have to be welded up in order to ensure that the stresses are distributed an uniformly as possible.

The method according to the invention may also be used for interconnecting new castings, and for connecting new castings to pieces of steel or other metal.

One means of increasing the strength of the repair or reinforcement consists in adding molten iron or molten steel of a suitable composition, or a metallic or other additive to the welding bath.

The durability of the repair or reinforcement may be improved by drilling small holes or by chipping recesses into the metal at the positions at which the welds are to be produced.

Referring to FIGURES 4 to 7, a preventatively reinforced ingot mold 1 is obtained by casting the ingot mold with a corset or endless casing 7 in a mold 6, the corset 7 being provided with holes 8 in which the molten metal forms bosses or projections 9 during the pouring operation. The dimensions of the bosses at the edges 10 exceed slightly those of the holes 8 to produce a rivet head of the kind shown.

It should be noted that the corset 7 thus obtained may include a small number of rivet heads 9, since by the method according to the invention the strain or initial tension during use is distributed more advantageously and uniformly than in the case of individual plates. Moreover, in view of the added strength obtained by the corset 7, the wall thickness of the ingot mold 1 may be reduced, so that its service life is further increased. Experience has shown that it is particularly thick-walled ingot molds which offer inadequate resistance to the irregular continuous or temporary expansions caused in the wall of the mold by the thermal shocks of successive ingot casting operations.

Figure 8:
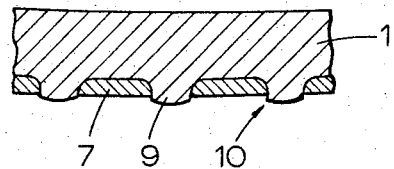
FIGURE 8 is an enlarged fragment of FIGURE 7 showing a first variation in the welded or soldered joint of the invention.
Figure 9:
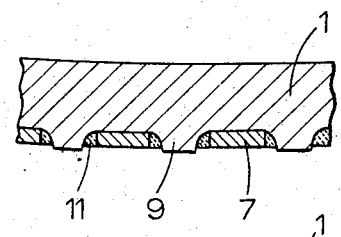
FIGURE 9 is an enlarged fragment of FIGURE 7 showing a second variation in the welded or soldered joint of the invention.
Figure 10:
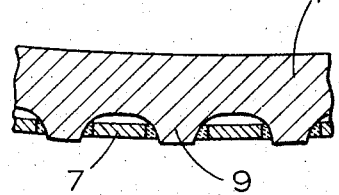
FIGURE 10 is an enlarged fragment of FIGURE 7 showing a third variation in the welded or soldered joint of the invention.

FIGURES 8 to 10 show sectional views of various constructions for the connection between the ingot mold wall 1 and the corset 7. In the case of FIGURE 8, the cast ingot mold wall is cast with a kind of rivet head at the position of each hole 8. In the case of FIGURES 9 and 10, in which no perforated plate or corset was placed inside the casting mold box before making the ingot mold, additional welds 11 are provided, the characteristic features of which are distinguishable in the drawings.

Welded joints of this kind are chiefly used where the corset 7 is to be joined to the ingot mold wall 1 subsequently, and in that case care may be taken, if desired, to ensure that the inner surface of the corset 7 stays at a short distance from the ingot mold outer surface.

It will be understood that the use of perforated plates or corsets and the like when making new ingot molds creates a pre-stressing effect. This is due to the fact that immediately after casting the ingot mold, the perforated plate, band or corset or the like, becomes quite as hot as the ingot mold walls themselves. As the ingot mold cools down and shrinks, the plate or jacket does the same. As is well-known, steel shrinks approximately twice as much as haematitic iron which is used for making the ingot mold. Thus when the ingot mold gets cold, its walls are under the pressure which the shrinking of the steel plate or jacket applies. This prestressing helps to keep the ingot mold from expanding again when steel is poured into it and it gets hot again, mainly inside. Thus cracking of the ingot mold is prevented or at least substantially delayed.

Variations of the foregoing disclosures, which come within the scope of the appended claims, are contemplated.

I claim:

1. A method of reinforcing castings comprising:
   a providing a cast iron molding box having integral cast projections extending from a surface thereof;
   providing a steel plate having openings therein corresponding to locations of said projections;
   positioning said plate adjacent said surface so that the projections extend through said plate openings; and
   welding the projections of the adjacent portions of said plate and, at the same time, adding molten metal to the weld metal so that said openings are completely filled with metal.

2. A method according to claim 1, wherein the plate extends completely around the side walls of said molding box.

3. A method of reinforcing castings comprising the steps of:
   providing a cast iron wall having projections extending from a surface thereof;
   providing a steel plate having openings therein corresponding to the locations of said projections, said openings having a cross section larger than the cross section of said projections;
   positioning said plate adjacent said surface so that the projections extend into and substantially completely through said plate openings, said plate being spaced from said surface with no metal plate intervening between said plate and said surface; and
   welding the projections to the portions of said plate adjacent the surfaces defining said openings whereby weld metal completely fills said openings including the space between said surfaces defining said openings and said projections.

4. A method of reinforcing castings comprising the steps of:
   a providing a cast iron wall having projections extending from a surface thereof, said projections being integrally cast thereon;
   providing a steel plate having openings therein corresponding to the locations of said projections;
   positioning said plate adjacent said surface so that the projections extend into said plate openings and said plate is spaced from said surface; and
   welding the projections to the adjacent portions of said plate.

5. A method of reinforcing castings comprising the steps of:
   providing a cast iron mold box with a well having projections extending from a surface thereof;
   providing a steel plate adapted to extend completely around the mold box and having openings therein corresponding to locations of said projections;
   positioning said plate completely around the mold box and adjacent said surface so that the projections extend into said plate openings and said plate is spaced from said surface; and
   welding the projections to the adjacent portions of said plate.

References Cited

UNITED STATES PATENTS

| | | | |
|---|---|---|---|
| 215,216 | 5/1879 | Coventry. | |
| 1,592,609 | 7/1926 | Mattice | 29—402 |
| 1,650,144 | 11/1927 | Mattice | 29—402 |
| 1,748,926 | 2/1930 | French | 29—401 |
| 1,807,477 | 5/1931 | Hume | 164—108 X |
| 1,927,306 | 9/1933 | Campbell | 164—332 X |
| 1,954,357 | 4/1934 | Leake | 29—401 |
| 1,954,358 | 4/1934 | Leake | 29—401 |
| 1,954,359 | 4/1934 | Leake | 29—401 |
| 2,000,599 | 4/1934 | Leake | 29—401 |
| 2,042,654 | 6/1936 | Dostal | 29—530 |
| 2,171,405 | 8/1939 | Sargent | 164—137 X |

FOREIGN PATENTS 1,369,342    7/1964    France.

J. SPENCER OVERHOLSER, *Primary Examiner.*

V. K. RISING, *Assistant Examiner.*